Nov. 25, 1958    D. POLLAN    2,861,497
FILM PROJECTOR INDEXING MEANS
Filed June 7, 1956
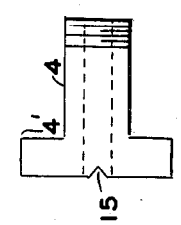
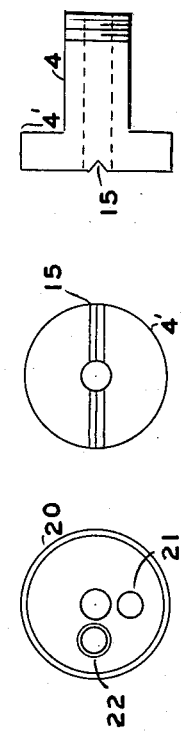
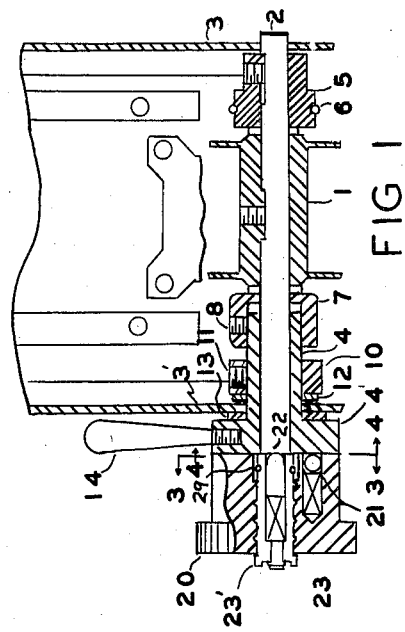
INVENTOR.
DAVID POLLAN

2,861,497
FILM PROJECTOR INDEXING MEANS

David Pollan, Jackson Heights, N. Y., assignor to Viewlex, Inc., a corporation of New York Application June 7, 1956, Serial No. 590,024

4 Claims. (Cl. 88—28)

This invention relates to film projector indexing means and more particularly to single and double frame indexing means.

Strip film projectors use both single and double frame film. Single frame pictures have their long dimension across the film, and double frame pictures have their short dimension across the film. Therefore, to advance double frame pictures, the drive sprocket must be turned twice as much as in changing single frame pictures.

Conventional projection apparatus generally has a detent mechanism for advancing single frame pictures only. Therefore, when showing double frame pictures, it is necessary to advance twice, which may cause confusion and the inadvertent showing of out of frame pictures, which greatly detracts from the enjoyment of the viewers.

The present invention provides means for indexing both single and double frame pictures without the necessity for counting the indexing positions. The present invention provides a detent mechanism of the spring-loaded ball type having one fixed ball and one retractable ball. When the adjustable ball is not retracted, the mechanism will index every 90° of rotation for single frame pictures. When the adjustable ball is retracted, the mechanism will index every 180° for double frame indexing.

Accordingly, a principal object of the invention is to provide new and improved film projector indexing means.

Another object of the invention is to provide new and improved film projector indexing means for single and double frame indexing.

Another object of the invention is to provide new and improved film projector indexing means for single and double frame indexing of the ball detent type having a fixed ball and a retractable ball.

Another object of the invention is to provide new and improved film projector indexing means for single and double frame indexing of the ball detent type having a fixed ball and a retractable ball on a radius 90° from the radius on which said fixed ball is located.

These and other objects of the invention will be apparent from the following specification and drawings, of which:

Figure 1 is a sectional view of an embodiment of the invention.

Figure 2 is a side view of the embodiment of Figure 1, and

Figures 3, 4, and 5 are detail views of the embodiment of Figure 1.

Referring to Figure 1, there is shown a film advancing mechanism comprising a sprocket 1 mounted on a shaft 2, the free end of the shaft being journaled to the frame 3 of the projector. A sleeve member 4, having an enlarged head 4', is rotatably positioned in the projector support 3', and the shaft 2 extends through the sleeve 4, being free to rotate within the sleeve. A sheave 5 is located on the right hand of the shaft 2 and has a belt 6 for driving a takeup roller. The sprocket 1 is centered on the shaft by means of the nut 7 which is fastened to the sleeve 4 with the set screw 8. The sleeve member 4 adjustably bears against the support 3', this adjustment being provided by the nut 10, which is screwed on the outer threaded surface of the sleeve 4 and secured by set screw 11. A spring wave washer 13 is placed on the outside of the support 3' and underneath the enlarged head 4' of the sleve 4. A lever 14 is screwed into the enlarged head 4'.

The face of the head 4' has a V-shaped notch 15 across a diameter thereof as shown in Figures 4 and 5. A knob 20 is fixedly mounted on the end of the shaft 2. The knob 20 has a first spring-loaded ball detent 21 and a retractable ball detent 22. The two ball detents are located on radii 90° apart, Figure 3. The retractable ball mounting is as follows: A hollow, externally threaded rod member 23 is mounted in a corresponding hole in the knob 20 and a spring loaded ball detent is mounted in the rod member 23. A small knob 23' is connected to the rod member 23. The rod member 23 is retracted by turning the knob 23' approximately a half revolution with respect to the knob 20. The axial motion of the rod 23 may be provided by threading the rod 23 or by providing a cam surface on the knob 23'. Retaining ring 29 limits travel of threaded rod 23.

Figure 2 shows a side view showing the relation of the knob 20 and takeup roller 28 to the film guide assembly 30. When assembling the mechanism, the nut 10 is adjusted on the sleeve 4 with sufficient tightness so that the lever 14 may be used for adjusting the framing of the film. When indexing the film, if the rod 23 is in retracted position, only the fixed position detent will contact the knob 15 of the head member 4', and the shaft 2 will rotate 180° for each index position. This position is used for indexing double frame film.

However, if the rod 23 is turned to the non-retractable position, the sprocket 1 will be advanced 90° for each indexing as both detent balls will then contact the knob 15. This position is used for indexing single frame film.

I claim:

1. In a film strip projector, 90° rotation and 180° rotation frame indexing means comprising support means having an opening, a hollow externally threaded sleeve having an enlarged head rotatably positioned in said opening, the face of said enlarged head having a notch across said face, adjustable friction members including a resilient member positioned on said sleeve and bearing against said support means, a shaft extending through said sleeve, a film sprocket connected to said shaft, a knob on the outer end of said shaft having a face in abutting relation to the face of said head, a fixed ball detent mounted in said knob, and a retractable ball detent mounted in said knob on a radius 90° from the radius on which said fixed ball detent is located.

2. A film strip indexing mechanism for 90° and 180° rotation, a rotatably mounted shaft, a film sprocket mounted on said shaft, a head member adjustably connected to said sprocket, the face of said head member being notched along a diameter thereof, a knob on the outer end of said shaft having a face in abutting relation to the face of said head, a fixed ball detent mounted in said knob, and a retractable ball detent mounted in said knob on a radius 90° from the radius on which said fixed ball detent is located.

3. In a film strip projector, 90° and 180° rotation frame indexing means comprising support means having an opening, a hollow externally threaded sleeve having an enlarged head rotatably positioned in said opening, the face of said enlarged head having a notch across said face, adjustable friction members including a resilient member positioned on said sleeve and bearing against said support means, a shaft extending through said sleeve, a film sprocket connected to said shaft, a knob on the outer end of said shaft having a face in abutting relation to the face of said head, a first ball detent mounted in said knob, a second ball detent adjustably mounted in said knob on a radius 90° from the radius on which said first ball detent is located, and means in said knob to retract said second ball detent.

4. In a film strip indexing mechanism, means to index 90° and 180° comprising a rotatably mounted shaft, a film sprocket mounted on said shaft, a head member adjustably connected to said sprocket, the face of said head member being notched along a diameter thereof, a knob on the outer end of said shaft having a face in abutting relation to the face of said head, a first ball detent mounted in said knob, a second ball detent adjustably mounted in said knob on a radius 90° from the radius on which said first ball detent is located, and means in said knob to retract said second ball detent.

References Cited in the file of this patent

UNITED STATES PATENTS

| | | |
|---|---|---|
| 2,126,474 | Kleerup | Aug. 9, 1938 |
| 2,330,709 | Harper et al. | Sept. 28, 1943 |
| 2,534,731 | Perillo | Dec. 19, 1950 |

FOREIGN PATENTS

| | | |
|---|---|---|
| 588,932 | Great Britain | June 5, 1947 |